Jan. 29, 1957 — P. SPENCE — 2,779,563
ADJUSTABLE LEVER VALVE
Filed Oct. 20, 1951 — 2 Sheets-Sheet 1
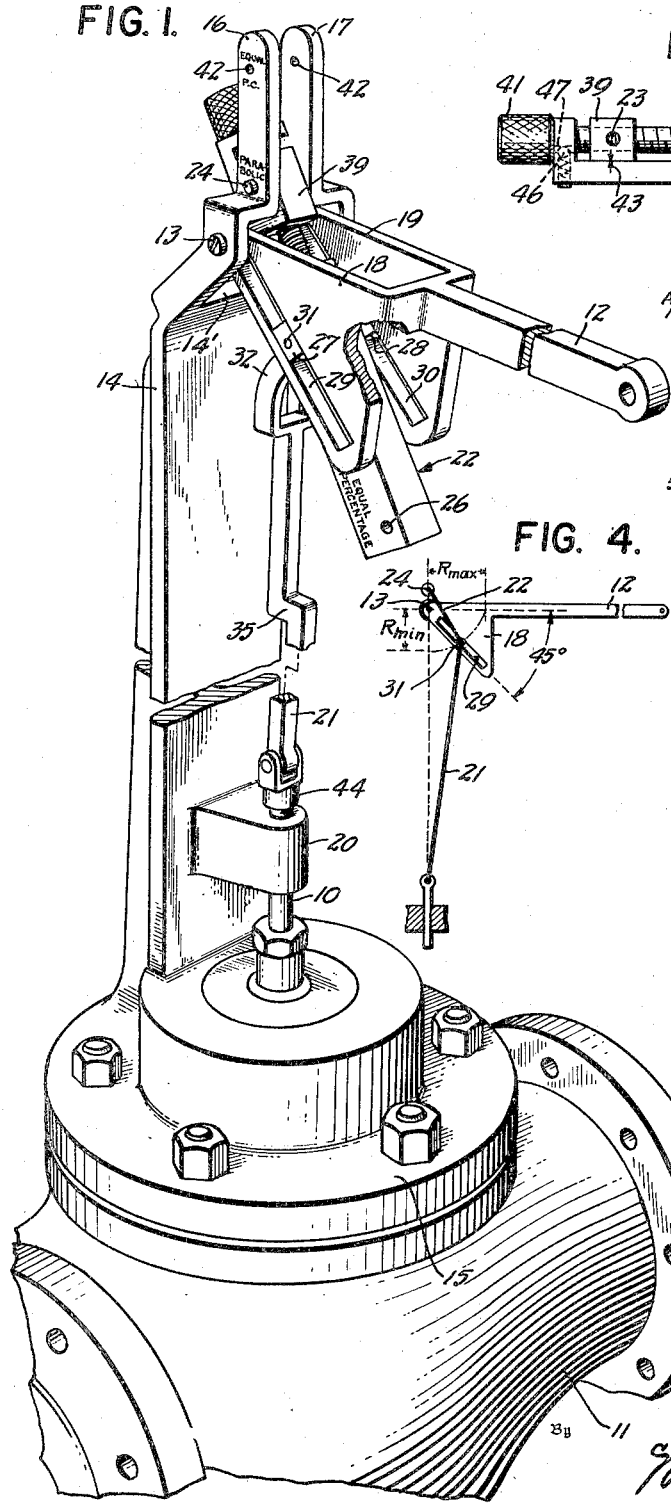
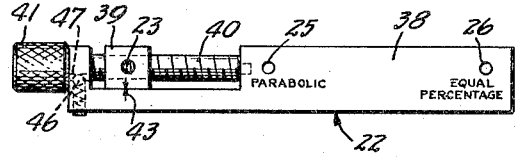
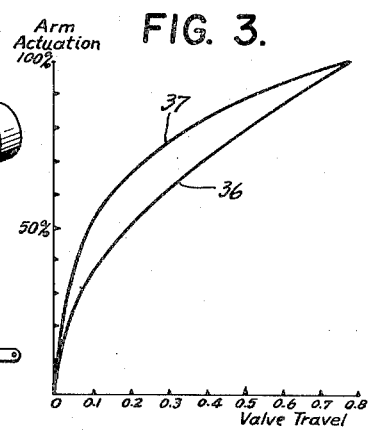
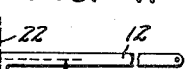
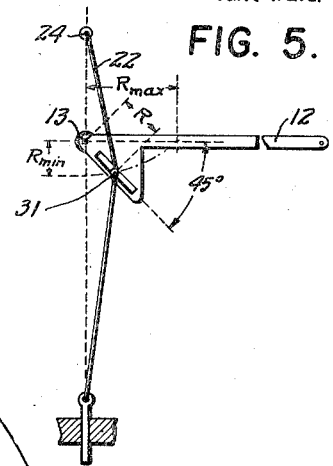
Inventor
PAULSEN SPENCE
Attorneys Jan. 29, 1957 P. SPENCE 2,779,563
ADJUSTABLE LEVER VALVE
Filed Oct. 20, 1951 2 Sheets-Sheet 2
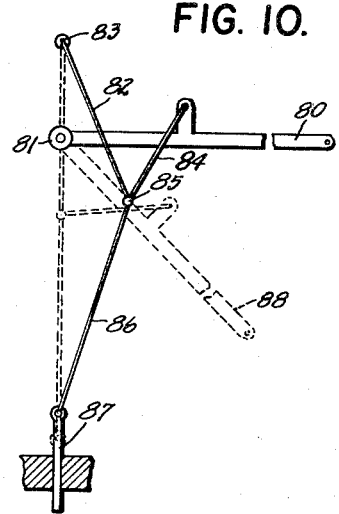
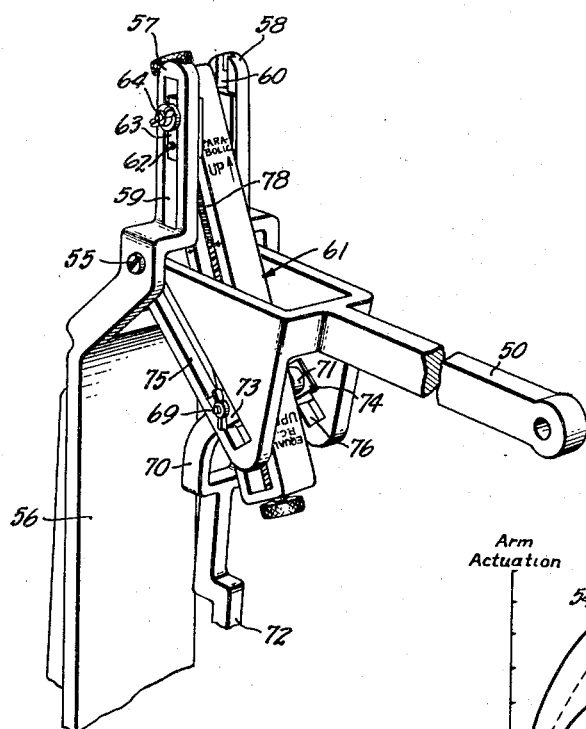
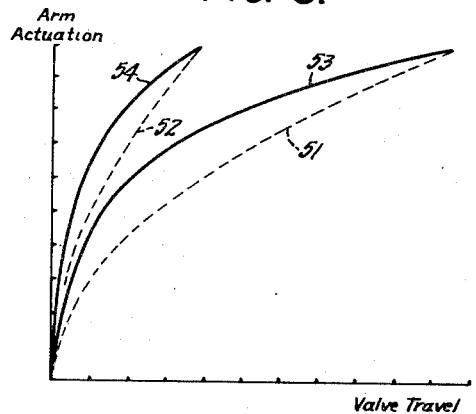
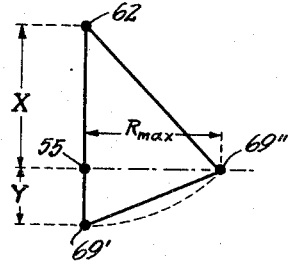
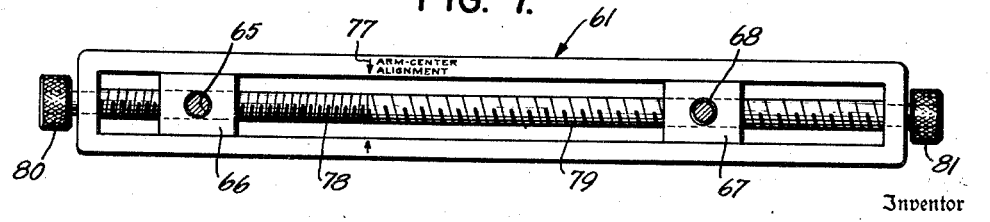
Inventor
PAULSEN SPENCE
By
Mitchell Beckert
Attorneys United States Patent Office 2,779,563
Patented Jan. 29, 1957

2,779,563

ADJUSTABLE LEVER VALVE

Paulsen Spence, Baton Rouge, La.

Application October 20, 1951, Serial No. 252,298

20 Claims. (Cl. 251—234)

My invention relates to valve-actuating mechanisms.

It has been recognized as desirable for many control-system applications that, for a constant-pressure drop across a valve, the valve should be able to produce a substantially constant unit change in flow for a unit change in actuating movement; for this purpose, it has been the practice to supply specially-contoured valve discs or members to produce a so-called "parabolic" characteristic. In other applications, it is desirable that, for a constant-pressure drop across the valve, a constant rate of change of flow be effected for a unit change in actuating movement; for this purpose, it has been the practice to supply other valve discs, specially-contoured to produce a so-called "equal-percentage" (logarithmic) characteristic. In both these cases, and in others in which the valve disc is specially contoured, the non-linear characteristic is unalterably tied down to a particular total travel of the valve member.

It is, accordingly, an object of the invention to provide improved mechanisms of the character indicated.

It is another object to provide improved valve-actuating means whereby the relationship between valve travel and a given actuation may have a desired non-linear characteristic.

It is also an object to provide a valve-actuating mechanism in which the degree of non-linearity in the relationship between valve-travel and a given actuation may be adjustably selectable.

It is a further object to provide a valve-actuating mechanism with a given non-linear characteristic and with means for adjustably selecting the total valve travel for a given actuating movement.

Another object is to provide a valve-actuating mechanism in which a simple reconnection of the same parts may selectably provide two different non-linear actuating characteristics.

It is a specific object to provide a relatively simple valve-actuating mechanism that may establish a substantially "parabolic" relationship between actuating movements and valve displacements.

Another specific object is to provide a relatively simple valve-actuating mechanism that may establish substantially an "equal-percentage" relationship between actuating movements and flow through the valve.

Still another specific object is to meet both the above specific objects in the same construction, whereby "parabolic" and "equal-percentage" characteristics may be selected as desired.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a perspective view of linkage elements of a valve-actuating mechanism according to the invention;

Fig. 2 is a side view of a subassembly used in the combination of Fig. 1;

Fig. 3 is a graph showing alternative characteristics available with the device of Fig. 1;

Figs. 4 and 5 are simplified diagrams schematically showing basic connections of the device of Fig. 1 in order to produce the respective characteristics of Fig. 3;

Fig. 6 is a fragmentary perspective view of another valve-actuating mechanism representing a modification of the arrangement of Fig. 1;

Fig. 7 is an enlarged side view of a subassembly used in the combination of Fig. 6;

Fig. 8 is a graph showing alternative characteristics available with the device of Fig. 6;

Fig. 9 is a geometrical diagram illustrating certain relationships in connection with the mechanism of Figs. 6 and 7; and Fig. 10 is a simplified diagram illustrating still another valve-actuating mechanism.

Briefly stated, my invention contemplates a relatively simple valve-actuating mechanism in which non-linearity in the movement of a valve member with respect to its seat is introduced by employment of what may be termed a variable eccentric. Specifically, in the forms shown, actuating movements may be applied to the mechanism by means of a crank or lever, and I show several means whereby the effective cranking radius thereof may be automatically varied during a given actuating movement, so that desired displacements of the valve stem may accompany the actuating movements. The variable-radius movement may be determined by a frame-based element spaced from the pivot for the actuating lever; this element may be a link fixedly pivoted at the frame-based location and movably connected at another point to either the actuating crank or the valve stem, the valve stem being connected to follow at least a component of the motion of the link and, therefore, with non-linearity, the movement of the actuating crank.

Referring to Figs. 1 to 5 of the drawings, I show my invention in application to the non-linear control of the displacement of a valve stem 10 for a valve 11 in response to actuation supplied to an actuating member in the form of a lever 12; the valve 11 will be understood to contain a fixed seat, with respect to which a valve member is actuated by stem 10, the lower position of stem 10 determining the closed condition of the valve shown. The lever 12 may be fixedly pivoted at 13 on a frame or standard 14 carried by the bonnet 15 of the valve 11. In the form shown, the upper part of the standard 14 is cut away at 14' to provide ample clearance for the variable-eccentric mechanism to be described, and the pivot means 13 for lever 12 may be provided in duplicate on the lower parts of upstanding arms 16—17 forming part of the standard 14. The pivot means 13 need only project inwardly sufficiently to support the spaced side members 18—19 at the pivoted end of lever 12. If desired, the standard 14 may include guide means 20 for the stem 10 to assure alignment of the stem regardless of the extent to which a connecting rod 21 is offset during an actuating movement.

In accordance with the invention, I provide means including a frame-based member connected to the frame at a location spaced from the arm-pivot axis 13 for determining the manner in which an eccentric-cranking radius of the arm 12 is applied to the connecting rod 21, for various angular positions of the actuating arm 12. The frame-based member is shown to include link means 22, which appears in greater detail in Fig. 2. Basically, the link means 22 provides a desired rigid spacing between two points; a first pivot point 23 may be based on the frame, as by pin suspension 24 between the upstanding arms 16—17, and the other pivot point may be connected to the connecting rod 21. For purposes which will later be explained, I provide a plurality of such other pivot points 25—26, so that one may select a desired non-linear characteristic in accordance with the particular point 25—26 to which the upper end of the connecting rod 21 is pinned.

Movable means may connect the actuating arm 12 with the selected movable pivot point of the link 22 and with the upper end of the connecting rod 21. Such means should be free to move in the direction of a changing effective radius as determined by the effectively rigid link means 22. In the form shown, the movable connection is established by means of a pair of blocks 27—28 sliding in ways 29—30 in the respective side members 18—19 of arm 12. The ways 29—30 may be generally radially directed with respect to the pivotal axis 13 of arm 12.

The complete assembly will then be seen to involve fixed pivoting (at 13) of the arm 12, fixed pivoting (at 24) of one end of link means 22, and a pivotal connection (at 31) between slide means 27—28 and the respective forked projections 32 at the upper end of connecting rod 21 and the movable end of link means 22.

The preferred relative size and angular relationships of the parts will depend upon limitations imposed by the total desired valve displacement and the total desired movement of the actuating arm 12. For an illustrative case, it may be assumed that the actuating arm 12 may have a total displacement of 90° and that such displacement is to carry the valve stem from a fully closed valve position to a maximum desired valve opening. The actuating arm may desirably have a midposition that is horizontal, so that the arm 12 will move from 45° below the horizontal to 45° above the horizontal, in the course of a complete actuating stroke. Whatever the total travel or desired orientation of the actuating arm 12, I prefer that, in the position of arm 12 which is to correspond to a closed valve condition, the pivot points 13—24—31 shall all be aligned or substantially aligned with the axis of valve-stem displacement. This condition will assure a relatively gradual initial valve opening upon initial movement of the actuating arm 12. I also prefer, but it is not necessary, that the guide means 29—30 be straight and directed radially of the pivotal axis 13; it will, however, be appreciated that modified non-linear characteristics may be obtained by otherwise orienting and curving the guide means 29—30.

To return to the assumed case involving 90° displacement of the actuating arm, it will be seen that the guide means 29—30 is displaced substantially 45° from the main arm of the actuating means 12. This condition will assure that for the "down" or closed-valve condition the guide means 29—30 will be in alignment with the valve-stem displacement axis and with the various pivotal axes 13—24—31. To permit the free assumption of the "down" position, that is, without the projecting end of link means 22 interfering with the connecting rod 21, the forked ends 32 and part of the main body of the connecting rod 21 may laterally offset, as at 35, as will be understood.

In operation, it will be seen that the effective cranking radius of the pin 31 amout the axis 13 is caused to vary from a minimum radius $R_{min}$, at the "down" position of the actuating lever 12, to a maximum radius $R_{max}$, at the top position of the lever 12 (see Figs. 4 and 5). The proportioning of the minimum radius to the maximum effective radius is determined by the spacing between pivotal axes 13—24 and by the selected length of the link means 22. I have found that with certain values of $R_{max}$ to $R_{min}$, the described linkage will produce desired non-linear relationships between movement of arm 12 and displacement of valve stem 10. For example, in the assumed 90°-travel case, a "parabolic" relationship may be obtained or very closely approximated when the ratio $R_{max}/R_{min}$ is substantially 1.35, and that the so-called "equal-percentage" characteristic may be obtained or very closely approximated when the ratio $R_{max}/R_{min}$ is substantially 2.3. By "parabolic," I mean a square-law relation between movement of arm 12 and displacement of valve stem 10, and such a characteristic, as produced by the described linkage, is shown at 36 in Fig. 3; this characteristic approximates a parabola well within the performance variations of individual valve discs. By "equal percentage" I mean a particular logarithmic relation between movement of arm 12 and displacement of valve stem 10, and this relationship, as produced by the described linkage, is shown at 37 in Fig. 3; again, the "equal-percentage" approximation is so close as to be well within performance variations of valve discs.

In accordance with the invention, the link means 22 is adaptable for connection to produce either the parabolic or the equal-percentage characteristic, as desired; provision may also be made for making small adjustments in total valve-stem displacement for a given total movement of the actuating arm 12. For this purpose, the link means 22 may comprise an elongated body 38 having an adjustable end to permit adjustable positioning of the fixed pivot point 23. At the other end of the body 38, the two pivot points 25—26 are provided with a fixed spacing depending upon the other dimensions and proportions of the complete linkage. The extreme pivot point 26 may be labeled "Equal Percentage," as shown in Fig. 2, and the remaining pivot point 25 may be labeled "Parabolic," in order to facilitate a correct set-up of the device.

In order to provide adjustable positioning of the fixed pivot point 23, I show the pivot point 23 of a slide block 39 whose position may be determined by a lead screw 40, as adjusted by a knurled knob 41 projecting out one end of the link means 22; spring-detent means 46 engaging a groove 47 in screw 40 may serve to hold a given adjusted axial placement of block 39.

As indicated generally above, the spacing between fixed pivots 13–24 will determine the ratio of $R_{max}$ to $R_{min}$ and, therefore, the degree of non-linearity in the valve-actuating characteristic. In order, therefore, for the frame means to accommodate both the indicated types of characteristic, the upstanding arms 16–17 of standard 14 may be drilled at spaced locations appropriate to the desired alternative characteristics. As shown, the fixed pin means 24 is inserted in the lower of these holes which, for convenience, may be labelled "Parabolic," as when the linkage is to be set for a parabolic characteristic, which is the condition shown in Fig. 1. Upper holes 42 may be labeled "Equal P. C." to indicate that, when the mechanism is to function with an "equal-percentage" characteristic, the pin means 24 for suspending slide block 39 is inserted in the upper position 42.

The functioning of the described parts for the alternative modes of operation may be better understood by reference to Figs. 4 and 5, which separately show the respective hook-ups for the mid-lever position. In Fig. 4, the pin means 24 fixedly suspends block means 39 from the lower or "parabolic" position of upstanding arms 16–17, and the pin means 31 connects slides 27–28 and connecting rod 21 to the "parabolic" pivot point 25 on link means 22; with such connections and with the knob 41 adjusted, say, near an extreme position, which might be calculated and marked, as shown at 43 in Fig. 2, a parabolic characteristic, as at 36, may be developed. Similarly, with pin means 24 suspending block 39 from the upper pivotal position 42, and with the pin means 31 connecting slides 27–28 and connecting rod 21 to the "equal-percentage" point 26 on link means 22, the equal-percentage characteristic 37 may be developed; this connection of parts is shown in Fig. 5.

Having made the particular connections of parts necessary for a desired actuating characteristic, it will ordinarily be necessary to effect a relative shortening or lengthening of the valve stem 10, as by a threaded adjustment between boss 44 and the valve stem 10, in order that the valve will be fully seated for the "down" position of the actuating mechanism. This is a simple adjustment which may be made after the parts have been hooked up as described.

Under certain circumstances, it may be desired that a total actuating movement of arm 12 shall not be accompanied by a maximum opening of the valve member. It will be appreciated that the adjustment means 41 incorporated into the link means 42 may, within limits, provide a means for effectively cutting down the total valve travel under such circumstances; for, as the block 39 is advanced along the lead screw 40 away from the extreme position depicted at 43, the effectively fixed length of the link means 22 may be shortened.

In Figs. 6 to 8, I show an alternative arrangement which, although perhaps more complex than the described arrangement of Figs. 1 to 5, exhibits the further feature that a "parabolic" or an "equal-percentage" or any other selected characteristic may be maintained as a true parabolic, equal-percentage, or other characteristic, whatever the selected total valve travel and for a full displacement of the actuating arm 50. In other words, in the arrangement of Figs. 6 to 8 one may obtain a parabolic characteristic 51 representing full valve travel for full movement of actuating arm 50, and another true parabolic characteristic 52 representing a selected lesser valve travel may be obtained for a full actuating movement of arm 50. Likewise, with appropriately changed connections in the mechanism of Figs. 6 and 7, one may obtain a true equal-percentage characteristic 53 for a full valve travel and another true equal-percentage characteristic 54 for a selected lesser valve travel. An infinite variety of true parabolic or equal-percentage characteristics may thus be obtained with the same connection of parts, to suit any desired maximum valve opening.

The linkage of Fig. 6 will be recognized as comprising many of the parts shown and described in Fig. 1. Thus, the actuating arm 50 may be pivoted at 55 to an upstanding standard 56 carried by the valve to be actuated. The upper part of the standard 56 may be characterized by two spaced arms 57–58. As distinguished from the arms 16–17 of Fig. 1, however, the arms 57–58 are provided with guide means 59–60 in which the upper pivot of the link means 61 is to be anchored. The upper pivot point may be defined by a pin 62 fixedly carried in a block 63 slidably guided by the guide means 59 and including means, such as washer and wing-nut means 64, for clamping a selected position of the pivot point 62. The pin means 62 may project inwardly to an extent necessary to engage one side of the pivot hole 65 (Fig. 7) in one of two slide blocks 66–67 on the link means 61. A pivot hole 68 in the other slide block 67 may receive pivot means 69 connecting the forked ends 70–71 and the connecting rod 72 to slide blocks 73–74, corresponding to blocks 27–28 in Fig. 1. The blocks 73–74 may, therefore, be freely slidable along ways 75–76 directed generally radially of the pivot axis 55 and carried by the actuating arm 50.

The relative positions of the slide blocks 66–67 with respect to a reference 77 along the link means 61 may be determined by a differential lead screw having a first threaded portion 78 for propulsion of block 66 and a second threaded portion 79 for propulsion of block 67. Knurled knobs 80–81 at either end of the lead-screw means 78–79 may provide convenient access for adjustment depending upon the particular connection of parts. It will be appreciated that the basic parts described in Figs. 6 and 7 are essentially the same as those in Fig. 1, except that the total effective length of the link means 61, that is, the span between pivot means 65–68 may be selectably adjusted.

I have found that by appropriately proportioning the pitches in lead-screw portions 78–79, and by always adjusting the vertical position of the slide block 63 so that the reference location 77 is aligned with the pivot axis 55 for the "down" position of the mechanism, there may always be a true equal-percentage or a true parabolic characteristic, depending upon whether the lead-screw portion 78 is up or down. When lead-screw portion 78 is in the "up" position, as shown in Fig. 6, a parabolic characteristic is obtained, and to facilitate the necessary connection of parts I have conspicuously labeled link means 61 with the legend "Parabolic-Up." For the alternative connection of parts, in which the equal-percentage characteristic is to be obtained, the link means 61 need only be reversed, end for end, so that the block 67 becomes suspended from pivot point 62 and the block 66 is pinned to the connecting rod 72; as in the parabolic hook-up, the wing nut 64 will have to be reset to assure alignment of reference 77 with the pivot axis 55, for the "down" position of the lever 50.

It has been indicated that the differential-screw means 78—79 may incorporate a single thread-pitch relation making possible the desired alternate connection of the link means 61 to produce parabolic or equal-percentage characteristics, as desired. For cases in which the total actuating-arm travel is 90°, the necessary relationship between these thread pitches may be readily derived by reference to the simplified diagram of Fig. 9. In this diagram, the geometry defining $R_{max}$ and $R_{min}$ is clearly set forth, and the fixed distance between the arm pivot 55 and the link pivot 62 is designated X; $R_{min}$ is labeled Y. Under these circumstances, the ratio $R_{max}/R_{min}$ may be expressed as follows:

$$\frac{R_{max}}{R_{min}} = \frac{\sqrt{(X+Y)^2 - X^2}}{Y}$$

It has been stated that a parabolic characteristic results when the ratio $R_{max}/R_{min}$ equals substantially 1.35, and that the equal-percentage characteristic results when this ratio is approximately 2.3. Under the circumstances, then, the relation of X to Y for a parabolic characteristic becomes $X = 0.41Y$, and the relation of X to Y for an equal-percentage characteristic becomes $X = 2.15Y$. These two proportional factors will be recognized as determining the necessary proportional relationship between the respective thread pitches of the differential screw means 78—79.

For simplicity of production, the relationship may be closely approximated by assuming that $X = 0.45Y$ for the parabolic characteristic, and that $X = 2.23Y$ for the equal-percentage characteristic. The relation between the latter two constants happens to be the same as the number 18 bears to the number 40; the desired differential motion may, therefore, be obtained if the threaded portion 78 is provided with, say, standard threads, 40 to the inch, left-hand, while the portion 79 is provided with standard threads, 18 to the inch, right-hand. Since both slide blocks 66—67 will be subjected to the same number of turns of the differential screw, and since their total displacements (with respect to reference 77) will vary inversely as the number of threads per inch on the respective ends of the differential-screw portion to which they are coupled, the necessary effective length of the threaded portion 78 may be related to the necessary effective length of the threaded portion 79 inversely as the screw-thread pitches and, therefore, as 18:40. When thus constructed, it will be appreciated that the limiting movement of the slide blocks 66—67 may occur, on the one hand, with both blocks meeting at the arm-center alignment reference 77, and, on the other hand, when blocks 66—67 abut the ends of the link means 61. As in the case of the link means 22 of Fig. 2, detent or other means (not shown) may be employed to hold a given adjustment of the screw means 78—79.

It has been indicated that certain preferred linkage proportions may obtain for the production of "parabolic" and "equal-percentage" characteristics, as desired, for the assumed total actuating-lever displacement of 90°. Naturally, other proportions may prove preferable in cases involving other total actuating-lever displacements. For example, in the common case of a total actuating lever displacement of 60°, $R_{max}/R_{min}$ may be substantially 1.1 for the parabolic characteristic and 1.65 for the equal-percentage characteristic.

In Fig. 10, I show a simplified alternative arrangement which may produce a particular non-linear characteristic without all the adjustment features of the other described forms. In the arrangement of Fig. 10, the actuating arm 80 is fixedly pivoted at 81, and a link 82 is fixedly pivoted at 83 a given distance removed from the pivot location 81. Again, the link 82 is movably related to the arm 80, but in Fig. 10 a further link 84 determines this relationship. The link 84 connects a part of the arm 80 with the free part of arm 82, as by a pin connection 85. The connecting rod 86 for the valve stem 87 may also be connected by pin means 85. As will be seen from the phantom outline 88 depicting the "down" position of the linkage, all pivots 81—83—85 are preferably in substantial alignment with the valve-stem axis for the "down" position. Valve lift for initial relatively large movement of the actuating arm 80 is relatively small, but at the final stages of actuation of the arm 80, the valve lift is characterized by substantially greater movements.

It will be seen that I have disclosed improved means for providing desired non-linear valve characteristics. My results may be obtained with conventional "quick-opening" valve discs, and no change in valve disc is necessary when changing the non-linearity of the characteristic. Although particularly described in connection with parabolic and equal percentage characteristics, it will be appreciated that my construction permits development of other non-linear performance, as desired. With my invention, it is practical to select the total valve lift for a given non-linear characteristic, and still to operate substantially on the same non-linear characteristic. My construction is basically simple and may be adapted to valves now in use, merely by removing the bonnet and applying my lever construction as a bonnet attachment.

While I have described my invention in considerable detail for the preferred forms shown, it will be understood that modifications may be made within the scope of the invention, as defined in the appended claims.

I claim:

1. In a valve-actuating mechanism of the character indicated, a frame including valve-stem guide means having a guide axis, an actuating arm pivotally supported by said frame on an axis transverse to and in general alignment with the axis of said valve-stem guide means, elongated guide means on said arm and in general radial alignment with the pivotal axis thereof, pivot means on said frame and spaced from the pivotal support for said arm and transverse to and in general alignment with the axis of said valve-stem guide means, a connecting rod having one point pivoted on said pivot means and a spaced point pivotally guided by said elongated guide means, and valve-stem connecting means freely pivotally connected at said spaced point of said connecting rod, whereby, for different angular relationships of said arm with respect to the axis of said guide means, the effective eccentricity for a cranked actuation of said valve-stem connecting means may be automatically varied, the length of said elongated guide means being sufficient to permit said mechanism to attain a relation in which said elongated guide means is substantially aligned with said valve-stem guide means, whereby a self-limiting seating position may be determined for a valve member connected to said valve-stem connecting means.

2. In a valve-actuating mechanism of the character indicated, frame means including valve-stem guide means having a guide axis, actuating means including an arm pivotally supported by said frame means on an axis transverse to and in general alignment with said guide axis, pivot means on said frame means and spaced from the pivotal support for said arm and in general alignment with said guide means, a connecting rod having one point pivoted on said pivot means and another connecting point spaced therefrom, valve-stem connecting means connected at said other point, and movable means connecting said other point to said actuating means, said movable means having sufficient freedom of movement to permit said arm to assume a position in which said other point is in general alignment with said guide axis.

3. In a valve-actuating means of the character indicated, a frame including valve-stem guide means having a guide axis, actuating means pivotally supported on said frame at a first location, valve-stem connecting means movably carried at one end by said actuating means at a location eccentric of said first pivot location, and a frame-based movable member pivotally connected to said frame at a second location spaced from the pivotal axis for said actuating means and rigidly connected at the point from which said valve-stem connecting means is carried by said actuating means, said first and second pivot locations being aligned with an axis substantially parallel to said guide axis, whereby upon a movement of said actuating means about its pivotal support the spacing between said first and second pivot connections may determine various eccentrically displaced connections of said valve-stem connecting means to said actuating means, the movable connection to said actuating means having such freedom of movement that said actuating means may assume a position in which said point is substantially aligned with the guide axis.

4. In a valve-actuating mechanism of the character indicated, an actuating linkage comprising a fixedly pivoted arm and valve-stem connecting means carried on said arm away from the pivotal axis thereof, said pivot and said valve-stem connecting means being in general alignment for one relative position corresponding to a closed-valve condition, whereby upon rotary actuation of said arm away from said relative position initial valve displacements determined by said valve-stem connecting means may be small for given actuations of said crank, and whereby upon displacement of said crank substantially away from said relative position such incremental actuations of said crank may determine relatively large stem displacements, and means for progressively increasing the effective radius of connection of said valve-stem connecting means to said crank with increasing actuating angle upon movement from said first relative position to said second relative position, whereby the relative smallness of first incremental valve openings and the relative largeness of final incremental valve movements may be further enhanced.

5. A device according to claim 4, in which said last-defined means includes a link fixedly pivoted at a point spaced from the pivot for said arm, said fixed pivot for said link being in general alignment with said valve-stem connecting means and with the pivotal axis for said arm when in said first relative position.

6. A device according to claim 4, in which said last-defined means is a rigid link fixedly pivoted at one point and connected at another point to said valve-stem connecting means.

7. A device according to claim 4, in which said last-defined means is a rigid link fixedly pivoted at one point and connected at another point to a part movably carried by said arm.

8. In a valve-actuating mechanism of the character indicated, frame means including valve-stem guide means having a guide axis, an actuating arm pivotally supported by said frame means about an axis transverse to and in general alignment with said valve-stem guide means, further guide means on said arm and directed generally radially of the pivotal axis thereof, slide means guided by said further guide means, valve-stem connecting means connected to said slide means, and means fixedly anchored at a location removed from the pivot for said arm and connected to said slide means, said last-mentioned location being also generally aligned with said valve-stem guide means.

9. In a valve-actuating mechanism of the character indicated, a valve-stem connecting rod to be connected at one end to a valve stem and to be actuated from the other end, a link fixedly pivoted at one end at a point generally aligned with the axis of valve-stem movement and connected at the other end to said other end of said valve-stem connecting rod, said link including means for selectively determining the effective length thereof, an actuating arm fixedly pivoted in general alignment with said valve-stem axis, and movable means carried with said actuating arm away from the pivot axis thereof and connected at the point of connetcion of said valve-stem connecting rod to said link, said movable means having sufficient freedom of movement to permit said arm to assume a position in which said point is in general alignment with the axis of valve stem movement.

10. In a valve-actuating means of the character indicated, frame means including valve-guide means having a guide axis, actuating means pivoted on said frame means at a location generally aligned with said guide axis, a link pivoted on said frame means at a location spaced from the pivot for said actuating means and generally aligned with said guide axis, a valve-stem-connecting rod connected to said link at a connecting point, and movable connecting means between said connecting point and said actuating means, the freedom of movement of said connecting means being sufficient to permit a position of said actuating means in which said connecting point is substantially aligned with the guide axis.

11. In a valve-actuating means of the character indicated, frame means including valve-stem guide means having a guide axis, an actuating lever pivoted on said frame means about an axis transverse to and in general alignment with said valve-stem guide means, a first link pivoted on said frame means at a location generally aligned with said valve-stem guide means and spaced from the pivot for said lever, a valve-stem-connecting rod connected to said first link, and a second link pivoted at one point to said lever and connected at a spaced point to the point of connection of said valve-stem-connecting rod and of said first link.

12. As an article of manufacture, an attachment assembly for a valve, comprising, a bonnet to fit the bonnet opening of the valve, and including frame means and valve-stem guide means having a guide axis, actuating means pivoted on said frame means in general alignment with the guide axis, a link pivoted on a part of said frame means spaced from the pivot for said actuating means and also in general alignment with the guide axis, valve-stem-connecting means connected to said link, and variable-eccentric connecting means between said actuating means and the point of connection of said link to said valve-stem-connecting means, said last-defined means having sufficient range of variation to permit said actuating means to assume a position in which said point is in general alignment with the guide axis.

13. As an article of manufacture, an adjustable link for adjustably varying the eccentricity of a lever in a valve-actuating mechanism of the character indicated, comprising an elongated body with two rigidly spaced pivot means at one end, elongated guide means at the other end of said body, pivot means movably guided by said guide means, and adjustable lead-screw propulsion means for said pivot means along said guide means.

14. In a valve-actuating means of the character indicated, frame means including valve-stem guide means having a guide axis, an actuating lever pivoted on said frame means about an axis transverse to and in general alignment with said guide axis, a valve-stem-connecting rod, movable connecting means movably connecting one end of said rod to said lever, and adjustable means including a differential screw connecting said one end of said rod to said frame means at a location spaced from the pivot for said actuating means, and in general alignment with said guide axis.

15. Valve-actuating means according to claim 14, in which the frame-pivoted end of said adjustable means is adjustably held in said guide means.

16. In a valve-actuating mechanism of the character indicated, a valve including a fixed seat and valve-member means including a stem movable with respect to said seat, guide means having a guide axis for said stem, actuating means pivotally supported on a fixed part of said valve about an axis transverse to and in general alignment with said guide axis, valve-stem connecting means connected to said actuating means eccentrically of the pivotal support thereof, and movable means including a fixed pivot connection to said valve in general alignment with said guide axis and responsive to the angular position of said actuating means about its pivotal support for varying the eccentricity of the point of connection of said valve-stem connecting means to said actuating means, said movable means having sufficient freedom of responsive movement to permit said actuating means to assume a position in which the point of connection of said valve-stem connecting means to said actuating means is in general alignment with the guide axis, said stem being in valve-closed position for such condition of general alignment.

17. A unitary structure comprising a valve bonnet and valve-actuating means including a valve-stem and guide means having a guide axis for said stem, an actuating arm pivotally supported in fixed relation to said bonnet and at a location generally aligned with said guide axis, valve-stem connecting means connected to said valve stem and to said actuating arm eccentrically of the pivotal support thereof, and movable means fixedly based in relation to said bonnet and responsive to the angular position of said actuating arm about its pivotal support for varying the eccentricity of the point of connection of said valve-stem connecting means to said actuating arm, said movable means having sufficient freedom of responsive movement to permit said actuating means to assume a position in which the point of connection of said valve-stem connecting means to said actuating means is in general alignment with the guide axis, said stem being in valve-closed position for such condition of general alignment.

18. Valve-actuating means according to claim 14, in which said adjustable means is a link comprising an elongated body including elongated slide-guide means, two slide pivot means guided by said slide-guide means, said differential screw being engaged to and interconnecting said two slide pivot means.

19. Valve-actuating means according to claim 18, in which said screw includes two differently pitched parts in separate threaded engagement with said respective pivot means.

20. Valve-actuating means according to claim 18, in which said screw includes two differently pitched parts in separate threaded engagement with said respective pivot means, said parts being oppositely pitched and in substantially the ratio 18:40.

References Cited in the file of this patent

UNITED STATES PATENTS

| | | | |
|---|---|---|---|
| 49,138 | Newbrough | Aug. 1, | 1865 |
| 213,025 | Yenne | Mar. 4, | 1879 |
| 271,099 | Moore | Jan. 23, | 1883 |
| 434,027 | Wade | Aug. 12, | 1890 |
| 436,139 | Juengst | Sept. 9, | 1890 |
| 712,268 | Dehekker | Oct. 28, | 1902 |
| 912,595 | McClaren | Feb. 16, | 1909 |
| 1,208,392 | Simmons | Dec. 12, | 1916 |
| 2,050,042 | Davis | Aug. 4, | 1936 |
| 2,315,370 | Hughes | Mar. 30, | 1943 |
| 2,498,249 | Cook | Feb. 21, | 1950 |
| 2,524,241 | Vetter | Oct. 3, | 1950 |
| 2,531,740 | Orscheln | Nov. 28, | 1950 |
| 2,534,959 | Deming et al. | Dec. 19, | 1950 |

FOREIGN PATENTS

| | | | |
|---|---|---|---|
| 605,286 | Great Britain | July 20, | 1948 |
| 635,956 | Great Britain | Apr. 19, | 1950 |